United States Patent [19]

Droessler et al.

[11] Patent Number: 6,147,807
[45] Date of Patent: Nov. 14, 2000

[54] HIGH BRIGHTNESS SEE-THROUGH HEAD-MOUNTED DISPLAY

[75] Inventors: Justin G. Droessler, Fridley; Teresa A. Fritz, Eagan, both of Minn.

[73] Assignee: Honeywell, Inc., Morristown, N.J.

[21] Appl. No.: 09/304,361

[22] Filed: May 4, 1999

[51] Int. Cl.[7] .................................................. G02B 27/14
[52] U.S. Cl. ........................................... 359/637; 359/633
[58] Field of Search .................................. 359/627, 629, 359/630, 637, 631, 633

[56] References Cited

U.S. PATENT DOCUMENTS

| | | | |
|---|---|---|---|
| 5,459,612 | 10/1995 | Ingleton | 359/630 |
| 5,537,253 | 7/1996 | Cox et al. | 359/630 |
| 5,576,887 | 11/1996 | Ferrin et al. | 359/631 |
| 5,706,136 | 1/1998 | Okuyama et al. | 359/630 |
| 5,818,641 | 10/1998 | Takahashi | 359/629 |
| 5,875,056 | 2/1999 | Takahashi | 359/637 |

*Primary Examiner*—Loha Ben
*Attorney, Agent, or Firm*—Kris T. Fredrick

[57] ABSTRACT

A head mounted display to view a created image and an external scene includes a display displaying the image and a prism receiving the image which includes a first surface for diffracting the image, and a second and third surface reflecting the image to a user of the head mounted display.

17 Claims, 3 Drawing Sheets

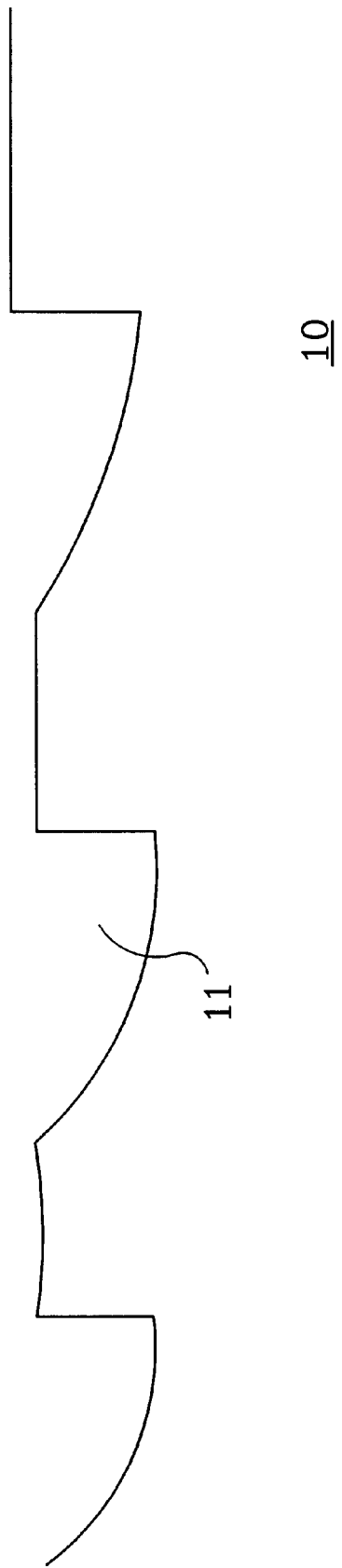

HIGH BRIGHTNESS SEE-THROUGH HEAD-MOUNTED DISPLAY

The Government has rights in this invention pursuant to Contract No. MDA972-95-3-0029, awarded by the Department of the Advanced Research projects Agency.

BACKGROUND OF THE INVENTION

Head mounted displays which generally allow for the simultaneous viewing of visual information and/or images generated by a computer or other source with and/or superimposed on a direct viewing of an external scene are well known. Such head mounted displays find utility in many areas, such as training, machine control, or entertainment. Such systems have found particular utility in military applications where information must be supplied to vehicle operators and weapons controllers. Aircraft pilots find such systems useful to furnish information relating to aircraft operation, weather radar presentations, maps, weapons aiming, and other such information.

In some systems, the visual information or visual images are superimposed on an optical combiner mounted on the head gear, sometimes a helmet visor, in view of the eye of the wearer, i.e., the observer's line of sight. These visual images may be derived from a variety of display sources including cathode ray tubes, fiber optic displays, flat panel liquid crystal or electroluminescent devices, some including image enhancers, and even photographic projectors operating with an appropriate optical relay system, all of which may supply the observer with visual information. The demand for smaller systems on the head with lighter weight requires use of the new micro miniature displays, measuring less than 1 inch across the diagonal. The field of view demanded, however, remains steady, or increasing, so this requires a very fast (low F/#) optical collimator.

FIG. 1 shows a current optical relay system. It is a lightweight system utilizing flat panel displays. However, there is a great loss in the throughput from the flat panel display to the eye, because the beam is transmitted once and reflected once at the beamsplitter, which results in at least 75% throughput loss. This then requires more power for the image source on the wearer's head which made the optical system heavier. This was an added burden for manufacturing costs as well as weight requirements. Another configuration of an optical system is described in U.S. Pat. No. 5,576,887. There is such a large tilt angle on the aspheric toroid in this design that the field of view is aberration- and space-limited. Further, this design as well as other current designs has low optical power and a much larger display with larger pixels was required. U.S. Pat. No. 5,706,136 discloses a more compact optical system, but it has three anamorphic surfaces which are very difficult to manufacture and does not correct for color aberrations. U.S. Pat. No. 5,818,641 also discloses a compact image display, but again does not teach any capability of correcting for color aberrations from the solid prism. Both of these systems can only support a small exit pupil, which means the optical system must be held very steadily in front of the eye. It would be desirable to make the exit pupil three times larger (making the system ⅓ the F/#) in order to mount the display on the head and allow for misalignment and movement of the eye. Furthermore, the above mentioned optical systems do not have the ability to use a high resolution display.

It would be desirable if a lightweight and smaller optical system with high throughput existed. It would be desirable if a cost efficient and optical system without positioning restraints existed. It would be desirable if less complex color correcting optical system existed. It would be desirable if an optical system existed with the ability to use a high resolution display. Further, it would be desirable if a less complex optical system overall, but equally operable optical system existed.

SUMMARY OF THE INVENTION

A head mounted display to observe a created image and an external scene simultaneously includes a display generating the image and a prism receiving the image. The prism has three optical surfaces. The first surface is a diffractive surface diffracting the image and correcting for chromatic and astigmatism aberrations. The second surface is a reflective surface, reflecting the beam to the third surface, and the third surface is a reflective surface with the majority of the optical power. Upon reflection and collimation, the beam is refracted through the second surface to a user of the head mounted display. A lens is used to correct for residual field aberrations in the image.

BRIEF DESCRIPTION OF THE DRAWINGS

FIG. 3 shows a magnified side view of the diffractive surface of the prism of the present invention.

DETAILED DESCRIPTION OF THE PRESENT INVENTION

Figure 1:
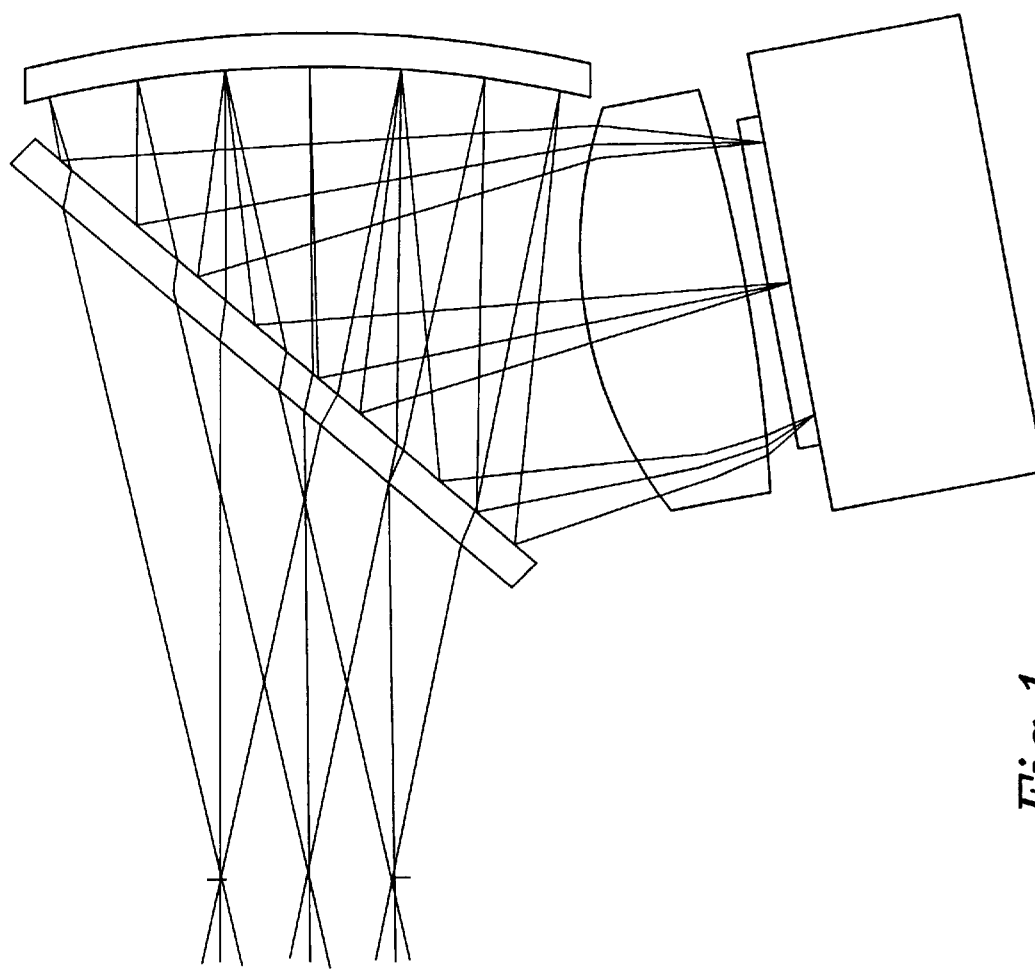
FIG. 1 shows a side view of an optical relay system.
Figure 2:
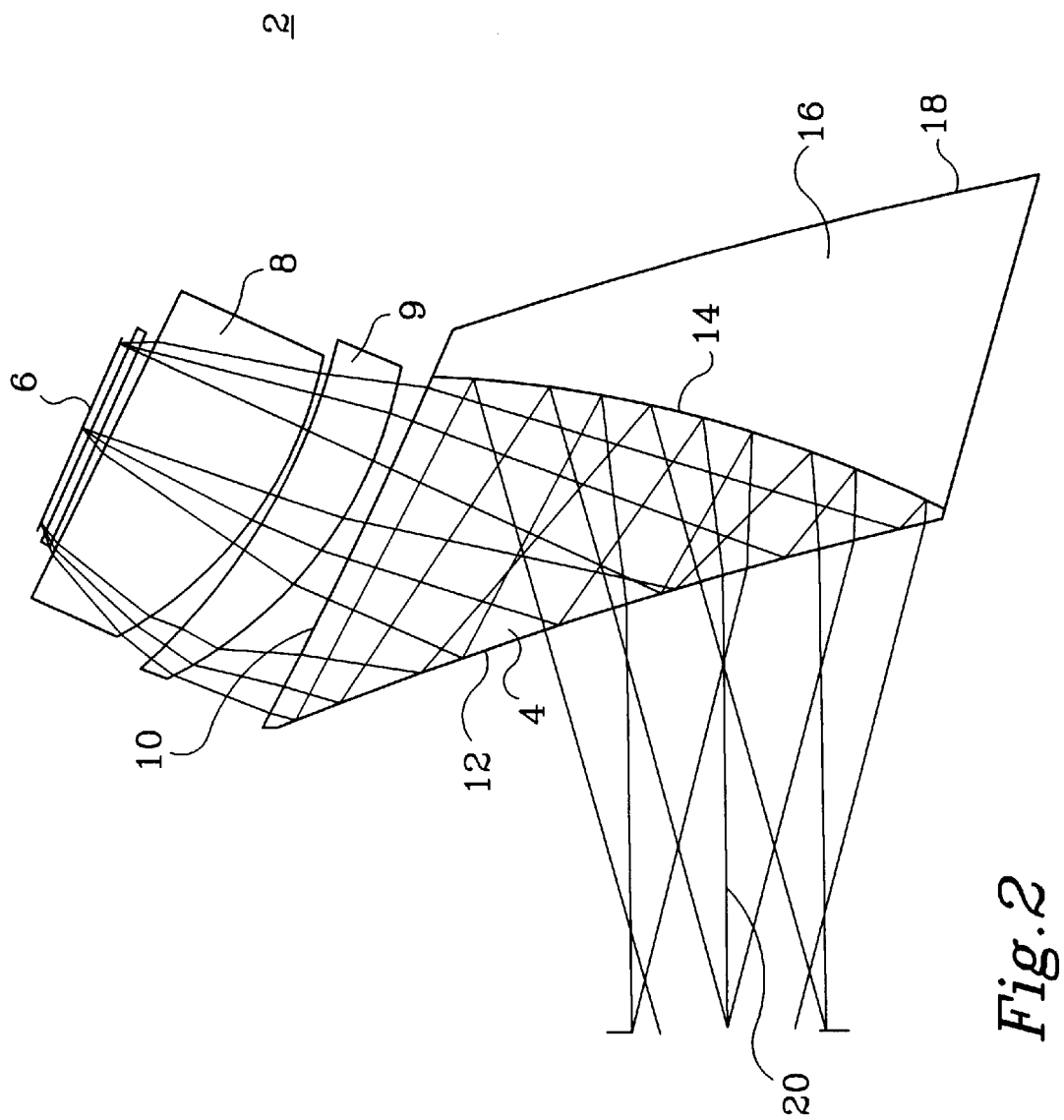
FIG. 2 shows a side view of the head mounted display of the present invention.

In a head-mounted display 2 of the present invention, a configuration is a simple structure to display an image as well as the view in front of the user. FIG. 2 shows the present invention 2, which has a single prism 4 that replaces the relay system of the previous configurations. A flat panel display 6 of full color capability, or any image display device, creates an image in the form of light beams that is sent through two lenses 8 and 9. The lenses 8 and 9 are used to correct for field aberrations. The number of lenses will vary depending on the aberration correction desired. However, due to weight limitations that are demanding, two lenses can adequately correct for most of the aberrations in the preferred embodiment. A high index of refraction lens is used in the present invention as an example of a preferred embodiment in order to make the system more compact, but not limited only this type of lens. Lenses are well known in this area of technology and will not be discussed in any further detail in this description.

The beams of the image are then transmitted to a prism 4 which has a first surface 10 that is curved with a surface for diffraction. The curve is a tilted sphere and it is important to have a diffractive surface to correct for color aberrations for a full color system. FIG. 3 shows a greatly increased view of the diffractive surface 10. The height of the grooves 11 depends on the wavelength of the image source and the width of the grooves 11 is determined by the particular aberration function. In the preferred embodiment, the diffractive surface is a portion of a rotationally symmetric aberration function, which corrects astigmatism and chromatic aberration. The diffractive surface, at the expense of diffractive efficiency, can be made bilaterally symmetric.

This corrects for nonsymmetric aberrations and the equivalent performance can be achieved with one lens. The diffractive surface has an Optical Path Difference function of $$OPD=-1.1565\times10^{-3}r^2-9.7813\times10^{-4}r^4+7.345\times10^{-8}r^6-3.3602\times10^{-10}r^8+5.9503\times10^{-13}r^{10}$$

where the OPD and radius are in millimeters. This function will vary with different embodiments.

The beams of the image are then reflected off a second surface 12 which is a total internal reflective surface. The second surface 12 is flat or nearly flat. The total internal reflection will reduce the loss that usually occurs in reflection of beams. This gives the present invention much higher throughput to the eye. To achieve the total internal reflection, the prism 4 is tilted at an angle so that the beams reflecting off the second surface 12 are at large angles. To achieve this, the prism 4 must be tilted toward the user such that the angle of incidence on the second surface 12 is greater than approximately 40 degrees depending upon the optical material. To achieve this angle, the second surface 12 and third surface 14 tilt positions are varied to achieve the desired angles.

The third surface 14, commonly referred to as the combiner surface, reflects the beams of the image to the user's eye. The shape of the third surface 14 is an aspherical toroid, but the present invention is not limited to this shape. This shape is used in the preferred embodiment since it is the preferred shape to correct for more aberrations such as astigmatism. The aspheric contour is given by $$z=-0.00496325y^2-3.4998\times10^{-7}y^4+9.09557\times10^{-11}y^6-3.57118\times10^{-14}y^8+2.92877\times10^{-18}y^{10}$$

and this curve is rotated about the y-axis through the center of curvature of 94.98 mm. These values are used for example purposes only in describing the preferred embodiment of the present invention. However, the present invention is not limited to these values and these values will vary with differing desired specifications regarding the present invention.

The tilt of the third surface 14 can be any angle less than 30 degrees with the line of view axis 20. This allows for optimal reflection of the beams of the image with little or no loss. With this constraint in the tilt of the third surface 14, the second surface 12 is also constrained in its range of tilt to maintain the angle discussed above. The beams of the image are then reflected through the second surface 12 towards the user.

A see through prism 16 is attached to the main prism 4 to allow the user to see the image as well as the external scene. The prisms of the preferred embodiment are made of polycarbonate, but any material that has good optical characteristics can be used. Polycarbonate is used in the present invention due to the low weight of the polycarbonate material and its good properties for molding. The shape of the see through prism 16 can be any shape to fit into the dimensions of the head mounted display 2 except for certain requirements on the surface 18 farthest to the eye of the user. This surface 18 must be nearly parallel with and concentric to the second surface 12 of the first prism 4 in order for the user to be able to see a unity power, distortion-free external scene. The system is highly corrected for coma, chromatic aberration, and astigmatism, which enables viewing of high resolution video imagery. This capability for full-color megapixel resolution is unique to previous designs shown. Most similar compact displays provide less than 200,000 pixel resolution.

All of the optical surfaces for the preferred embodiment can be generated using single-point diamond-turning techniques on a polymer prism or a metal mold form, but other techniques such as a laser mask technique can be used depending on the diffractive function desired. The present invention provides an optical system 2 for a head-mounted display, and therefore has a very large exit pupil (at least 12 mm) so the eye will see a good image anywhere in that pupil location. The system 2 is a very fast optical system (F/1.7) and uses a 15.4×12.3 mm display device to deliver a 40°×32° field of view to the eye. This allows for lucid viewing with a large field of view. These values are used for example purposes only in describing the preferred embodiment of the present invention. However, the present invention is not limited to these values and these values will vary with different requirements that may exist. Another advantage to the present invention over the previous configurations is that loss is decreased significantly. Previously, each component would add to the loss of the image so that the image was not as bright. The present invention uses a single component, the prism 4, which greatly decreases the loss of the image.

The invention has been described herein in detail in order to comply with the Patent Statutes and to provide those skilled in the art with the information needed to apply the novel principles and to construct and use such specialized materials and components as are required. However, it is to be understood that the invention can be carried out by specifically different materials and components, and that various modifications, both as to the processing details and operating procedures, can be accomplished without departing from the scope of the invention itself.

The embodiments of the invention in which an exclusive property or right is claimed are defined as follows:

1. A head mounted display, comprising:
   a display providing an image to a lens to correct for any aberrations in the image and further projecting the image; and
   a first prism, made of a lightweight polymeric material, receiving the image and comprising at least three optical surfaces, a first surface, a second surface, and a third surface wherein the first surface is a diffractive surface diffracting the image to the second surface, the second surface is a reflective surface reflecting the image to the third surface and the third surface is a reflective surface reflecting the image to a user of the head mounted display.

2. The head mounted display of claim 1, further comprising:
   a second prism attached to the first prism wherein the second prism is see through so that the user may see the image simultaneously with an external scene.

3. The head mounted display of claim 2 wherein the second prism is made of a lightweight polymeric material.

4. The head mounted display of claim 1 wherein the first surface is curved.

5. The head mounted display of claim 1 wherein the second surface is a total internal reflective surface.

6. The head mounted display of claim 1 wherein the second surface is flat or nearly flat.

7. The head mounted display of claim 1 wherein the third surface is a toric asphere shape.

8. The head mounted display of claim 1 wherein the second surface is tilted towards the user.

9. A head mounted display, comprising:
   a display providing an image to a lens to correct for any aberrations in the image and further projecting the image;
   a first prism, receiving the image, comprising at least three surfaces, a first surface, a second surface, and a third surface wherein the first surface is a diffractive surface diffracting the image to the second surface, the second surface is a total internal reflective surface reflecting the image to the third surface and the third surface is a reflective surface reflecting the image to a user of the head mounted display; and a second prism, the first prism and the second prism made of a polycarbonate material, attached to the first prism wherein the second prism is see through so that the user may see the image simultaneously with an external scene.

10. The head mounted display of claim 9 wherein the first surface is curved.

11. The head mounted display of claim 9 wherein the second surface is flat or nearly flat.

12. The head mounted display of claim 9 wherein the third surface is a toric asphere shape.

13. An image display apparatus, comprising:

an image display device displaying an image;

an optical system for providing the image displayed by the image display device to an observer wherein the optical system has at least three surfaces, a first surface is a diffracting surface, a second surface is a reflecting surface, and a third surface which is a reflecting surface facing the second surface; and wherein the optical system, made of a lightweight polymeric material, is arranged such that light rays emitted from the image display device pass through the first surface and are internally reflected by the second surface and further internally reflected by the third surface and the reflected light rays pass through the second surface and are led to the observer.

14. The image display apparatus of claim 13 wherein the first surface is curved.

15. The image display apparatus of claim 13 wherein the second surface is a total internal reflective surface.

16. The image display apparatus of claim 13 wherein the second surface is flat or nearly flat.

17. The image display apparatus of claim 13 wherein the third surface is a toric asphere shape.

* * * * *